(12) United States Patent
Wang et al.

(10) Patent No.: US 10,021,870 B2
(45) Date of Patent: Jul. 17, 2018

(54) REAL-TIME COUNTING INSECTICIDAL LAMP

(71) Applicant: Nanjing Agricultural University, Nanjing, Jiangsu (CN)

(72) Inventors: Xiaochan Wang, Jiangsu (CN); Tingting Yan, Jiangsu (CN); Guoxiang Sun, Jiangsu (CN); Guyue Hu, Jiangsu (CN)

(73) Assignee: Nanjing Agricultural University, Nanjing, Jiangsu (CN)

( * ) Notice: Subject to any disclaimer, the term of this patent is extended or adjusted under 35 U.S.C. 154(b) by 302 days.

(21) Appl. No.: 15/172,901

(22) Filed: Jun. 3, 2016

(65) Prior Publication Data
US 2017/0273294 A1    Sep. 28, 2017

(30) Foreign Application Priority Data

Mar. 28, 2016    (CN) .......................... 2016 1 0184438

(51) Int. Cl.
| | |
|---|---|
| *A01M 1/22* | (2006.01) |
| *F21V 23/00* | (2015.01) |
| *F21V 23/02* | (2006.01) |
| *F21V 23/04* | (2006.01) |
| *F21V 31/00* | (2006.01) |
| *F21Y 101/02* | (2006.01) |

(52) U.S. Cl.
CPC ........... *A01M 1/223* (2013.01); *F21V 23/001* (2013.01); *F21V 23/003* (2013.01); *F21V 23/02* (2013.01); *F21V 23/04* (2013.01); *F21V 31/00* (2013.01); *A01M 2200/01* (2013.01); *F21Y 2101/02* (2013.01)

(58) Field of Classification Search
CPC .... A01M 1/223; F21V 23/001; F21V 23/003; F21V 23/02; F21V 23/04
See application file for complete search history.

(56) References Cited

U.S. PATENT DOCUMENTS

| | | | | |
|---|---|---|---|---|
| 2005/0025357 A1* | 2/2005 | Landwehr | ............. | A01M 1/026 |
| | | | | 382/170 |
| 2006/0150470 A1* | 7/2006 | Ronnau | ................. | A01M 1/026 |
| | | | | 43/58 |
| 2007/0169401 A1* | 7/2007 | Chyun | .................. | A01M 1/145 |
| | | | | 43/113 |
| 2008/0181352 A1* | 7/2008 | Hirafuji | ................ | A01M 1/026 |
| | | | | 377/16 |

(Continued)

*Primary Examiner* — Christopher P Ellis
(74) *Attorney, Agent, or Firm* — Rankin, Hill & Clark LLP

(57) ABSTRACT

A real-time counting insecticidal lamp includes a rainproof cover, a LED lamp body, an insect receiver, and a high-voltage grid; the rainproof cover is arranged above the lamp body, the insect receiver is arranged below the lamp body, and the high-voltage grid is arranged at the periphery of the lamp body; the high-voltage grid includes a high-voltage direct current power supply and N-1 wires, and the N-1 wires are arranged in parallel in each interval to form a circle, wherein, N is no less than 10; top ends of the wires are all connected to the power supply end of the power supply, but one of two adjacent wires is electrically connected to the positive end of the power supply while the other is electrically connected to the negative end; the real-time counting insecticidal lamp also includes a counting unit.

5 Claims, 2 Drawing Sheets

(56) References Cited

U.S. PATENT DOCUMENTS

| | | | |
|---|---|---|---|
| 2009/0220428 A1* | 9/2009 | Grau | A01N 47/44 |
| | | | 424/9.2 |
| 2011/0030266 A1* | 2/2011 | Roy | A01M 1/08 |
| | | | 43/113 |
| 2014/0190071 A1* | 7/2014 | Mistretta | A01M 1/223 |
| | | | 43/112 |
| 2017/0094960 A1* | 4/2017 | Sasaki | H02S 40/38 |
| 2017/0223943 A1* | 8/2017 | Park | A01M 1/026 |
| 2017/0367314 A1* | 12/2017 | Billingsley, Jr. | F21V 3/061 |

* cited by examiner

REAL-TIME COUNTING INSECTICIDAL LAMP

TECHNICAL FIELD

The present invention relates to an trap lamp for agricultural insects.

BACKGROUND

Our country is a big agricultural country, and the healthy development of agriculture is relating to the roots of the state. In recent years, with the improvement of living standard, customers demand for the quality and safety of agricultural products continuously. Modem agriculture is the organic combination of physical technologies and agricultural production, which is an environment control type agriculture that controls the living environments and growing development of animals and plants through such physical factors having biological effects like electricity, sound, light, magnetism, heat, nucleus, or the like, promotes the conventional agriculture to gradually get rid of the dependence on such chemicals like chemical pesticides, chemical fertilizers and antibiotics, and finally obtains non-toxic agricultural products with good quality and high volume. Therefore, the principal job for predicting injurious insects is to recognize the injurious insects and accurately obtain the quantity information.

Conventional injurious insect recognition and counting are mainly subjected to an artificial recognition method, a field survey method, a trapping method, or the like. The artificial recognition and counting severely has such defects like low recognition rate, poor counting accuracy, high field task labor intensity and being not in real time due to such factors like complicated and instable field environments, and this method cannot satisfy the monitoring requirements on a condition that the current injurious insects in the fields are severe. The field survey method consumes time and effort, and has more procedures in data investigation, recording and reporting, has high workload for monitoring personnel, is largely affected by subjective factors, and has poor data application timeliness, which affects the accurate prediction of the injurious insects, and cannot satisfy the actual production requirements. In order to solve the problems of time and effort consuming for recognizing the injurious insects and obtaining the quantity data, scientists are continuing to explore new technologies for automatically recognizing and counting injurious insects.

With the development of computer technology, microelectronic technology or the like, a great progress has been made on technologies for automatically recognizing and counting injurious insects. At present, the technologies for automatically recognizing and counting injurious insects mainly include sound signal, image technology, infrared sensor, or the like. The development of these technologies improve the efficiency for automatically recognizing and counting injurious insects, promotes the implementation of accurate agriculture, reduces the losses caused by the injurious insects, reduces the environment pollution, and improves the be comprehensive control level of the injurious insects. However, although the infrared counting method has a quick speed and can record the quantity of the insects trapped, it is weaker in recognizing the types of the injurious insects, and is easily disturbed by other articles fell into. Because the injurious insects trapped in fields are different in gestures and are different to master samples, the image processing method which is subjected to classifier training on the basis of the morphological specificity of a standard gesture, is easy to weaken the classifier generalization ability, and is not beneficial for recognizing the injurious insects and counting the quantity thereof.

The above solutions for counting injurious insects are either complicated or counts inaccurately.

SUMMARY

The object of the present invention is to provide a real-time counting insecticidal lamp capable of implementing an automatic counting function while trapping and killing injurious insects.

To fulfill the foregoing object, the present invention adopts the following technical solution. A real-time counting insecticidal lamp includes a rainproof cover, a LED lamp body, an insect receiver, and a high-voltage grid, the rainproof cover being arranged above the LED lamp body, the insect receiver being arranged below the LED lamp body, and the high-voltage grid being arranged at the periphery of the LED lamp body, wherein:

the high-voltage grid includes a high-voltage direct current power supply and N−1 wires, and the N−1 wires are arranged in parallel in each interval to form a circle, wherein, N is no less than 10;

the top ends of the wires are all connected to the power supply end of the high-voltage direct current power supply, but one of two adjacent wires is electrically connected to the positive end of the power supply while the other is electrically connected to the negative end of the power supply;

an injurious insect counting unit is further included, wherein:

the injurious insect counting unit includes a direct current constant-current source, an analogue-to-digital conversion module, N resistors with same resistance values, (2N−2) high-frequency switches, a controller and a display module;

the two ends of the N resistors with same resistance values after being connected in series are connected to the two output ends of the direct current constant-current source;

the input end of the analogue-to-digital conversion module is connected to the two output ends of the constant-current source;

the output end of the analogue-to-digital conversion module is electrically connected to an IO input port of the controller;

the display module is electrically connected to the controller;

the N resistors with same resistance values have N−1 common nodes in total;

the bottom ends of the N−1 wires are electrically connected to one common node respectively through the high-frequency switches, but the bottom ends of adjacent wires are located at the two ends of the same resistor; and the high-frequency switches all include a control end, and the control ends of the high-frequency switches are all electrically connected to the controller.

As a preferable technical solution, the output current of the direct current constant-current source is 15 mA, N=30, and the resistance value of the resistor is 1 ohm.

As a preferable technical solution, the interval between adjacent wires is 2-20 mm.

As a preferable technical solution, the voltage of the high-voltage direct current power supply is 200-20000V.

As a preferable technical solution, the high-frequency switch is implemented using a controllable thyristor, and the switching frequency is over millisecond.

A counting method for a real-time counting insecticidal lamp includes a rainproof cover, a LED lamp body, an insect receiver, and a high-voltage grid; the rainproof cover being arranged above the LED lamp body, the insect receiver being arranged below the LED lamp body, and the high-voltage grid being arranged at the periphery of the LED lamp body, wherein:

the high-voltage grid includes a high-voltage direct current power supply and N−1 wires, and the N−1 wires are arranged in parallel in each interval to form a circle, wherein, N is no less than 10;

the top ends of the wires are all connected to the power supply end of the high-voltage direct current power supply, but one of two adjacent wires is electrically connected to the positive end of the power supply while the other is electrically connected to the negative end of the power supply;

an injurious insect counting unit is further included;

the injurious insect counting unit includes a direct current constant-current source, an analogue-to-digital conversion module, N resistors with same resistance values, (2N−2) high-frequency switches, a controller and a display module;

the two ends of the N resistors with same resistance values after being connected in series are connected to the two output ends of the direct current constant-current source;

the input end of the analogue-to-digital conversion module is connected to the two output ends of the constant-current source;

the output end of the analogue-to-digital conversion module is electrically connected to an IO input port of the controller;

the display module is electrically connected to the controller;

the N resistors with same resistance values have N−1 common nodes in total;

the bottom ends of the N−1 wires are electrically connected to one common node respectively through the high-frequency switches, but the bottom ends of adjacent wires are located at the two ends of the same resistor; and the high-frequency switches all include a control end, and the control ends of the high-frequency switches are all electrically connected to the controller.

When the voltage U outputted by the analogue-to-digital conversion module is equal to I*R*N millivolt, the controller controls all the high-frequency switches at the bottom end of the wires to be switched on; and all the high-frequency switches at the top ends of the wires to be switched off;

when the voltage U outputted by the analogue-to-digital conversion module is less than I*R*N millivolt, the controller controls an insect variable a inside the controller to be added with 1, and meanwhile, the controller controls all the high-frequency switches at the bottom ends of the wires to be switched off, all the high-frequency switches at the top end of the wires to be switched on, then a direct current circuit of the high-voltage grid is switched on to kill the injurious insects;

wherein, I is the current value of the direct current constant-current source, and the unit is milliampere; and R is the resistance value of each resistor.

The working principle of the present invention is described as follows: at a steady state, the high-frequency switches at the bottom ends of the wires are switched on, and the circuit of the injurious insect counting unit is switched on, then the controller judges whether insects fall on the high-voltage grid according to the voltage outputted by the analogue-to-digital conversion module; the voltage outputted by the analogue-to-digital conversion module will change at the moment that the injurious insect hit the wires (because resistors will be short-circuited), the controller will detect the change of the voltage outputted by the analogue-to-digital conversion module; at this moment, the insect variable a is added with 1; the controller judges there are injurious insects hitting the grid, and controls the instantaneous action of the high-frequency switches, wherein all the high-frequency switches at the bottom ends of the wires are switched off while all the high-frequency switches at the top ends of the wires are switched on, so that the voltage on the wire is switched from a low voltage to a high voltage, and the injurious insects are killed by the electrocution of the high-voltage grid, wherein the insect a is just "the quantity of the insects killed by electrocution", so that the function of automatically counting of the trap lamp is implemented while killing the insects.

Compared with the present technical solution, the present invention has the advantageous effects that: firstly, the present invention can accurately count the quantity of injurious insects trapped and killed while trapping and killing the injurious insects, and can remind the farm principal to spray pesticides in time when the quantity of the injurious insects reaches a pre-warning threshold; secondly, the present invention has a very simple structure and low manufacturing cost; and thirdly, the present invention can approximately determine the approximate sizes of the insects killed by electrocution while counting the quantity of the injurious insects.

Figure 1:
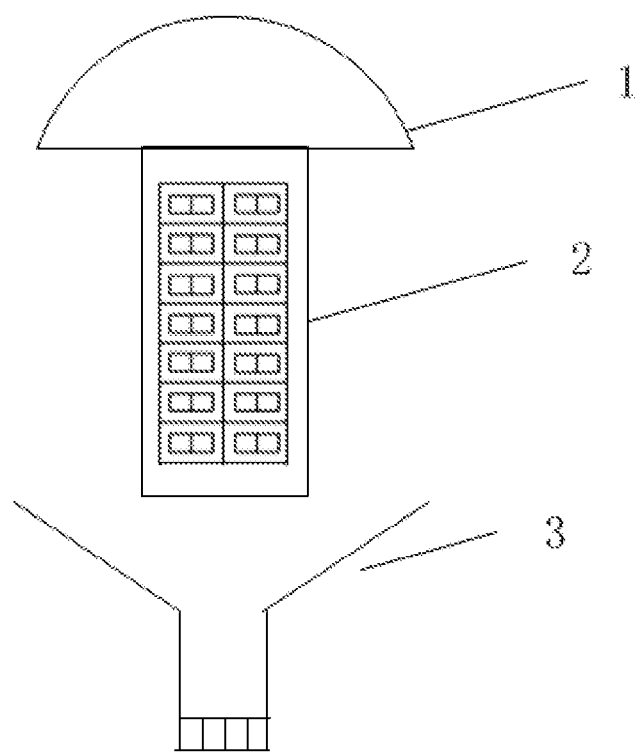
FIG. 1 is a structural schematic diagram of a trap lamp in the present invention.

1 refers to a rainproof cover; 2 refers to a LED lamp body; 3 refers to an insect receiver; 4 refers to a wire of high-voltage grid; 5 refers to an insulated fixing device of high-voltage grid; 6 refers to a high-frequency switch; 7 refers to high-voltage direct current power supply; 8 refers to wire; 9 refers to direct current constant-current source; 10 refers to analogue-to-digital conversion module; 11 refers to display module; 12 refers to controller.

DETAILED DESCRIPTION

The present invention will be further explained in details hereinafter with reference to the drawings, but the descriptions do not represent the unique embodiment of the present invention.

Embodiment 1 a real-time counting insecticidal lamp includes a rainproof cover 1, a LED lamp body 2, an insect receiver 3, and a high-voltage grid, wherein the rainproof cover 1 is arranged above the LED lamp body 2, the insect receiver 3 is arranged below the LED lamp body 2, and the high-voltage grid is arranged at the periphery of the LED lamp body 2; and the high-voltage grid includes a high-voltage direct current power supply and 29 wires, and the 29 wires are arranged in parallel in each interval to form a circle, wherein, N=30; the top ends of the wires are all connected to the power supply end of the high-voltage direct current power supply, but one of two adjacent wires is electrically connected to the positive end of the power supply while the other is electrically connected to the negative end of the power supply; an injurious insect counting unit is further included; the injurious insect counting unit includes a direct current constant-current source, an analogue-to-digital conversion module, 30 resistors with same resistance values, 58 high-frequency switches, a controller and a display module; the two ends of the 30 resistors with same resistance values after being connected in series are connected to the two output ends of the direct current constant-current source; the input end of the analogue-to-digital conversion module is connected to the two output ends of the constant-current source; the output end of the analogue-to-digital conversion module is electrically connected to an IO input port of the controller; the display module is electrically connected to the controller; the 30 resistors with same resistance values have 29 common nodes in total; the bottom ends of the 29 wires are electrically connected to one common node respectively through the high-frequency switches, but the bottom ends of adjacent wires are located at the two ends of the same resistor; and the high-frequency switches all include a control end, and the control ends of the high-frequency switches are all electrically connected to the controller.

Wherein, the output current of the direct current constant-current source is 15 mA, N=30, and the resistance value of the resistor is 1 ohm. The interval between adjacent wires is 2 mm.

Wherein, the voltage of the high-voltage direct current power supply is 2000V. The high-frequency switch is implemented using a controllable thyristor, and the switching frequency is over millisecond.

Figure 2:
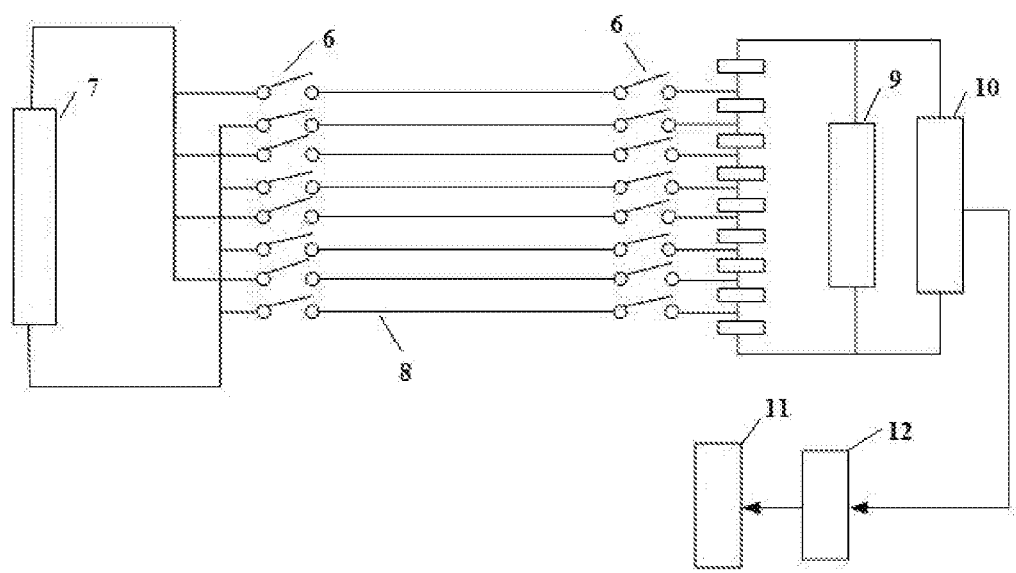
FIG. 2 is a schematic diagram showing circuit principles of a high-voltage grid and an injurious insect counting unit.
Figure 3:
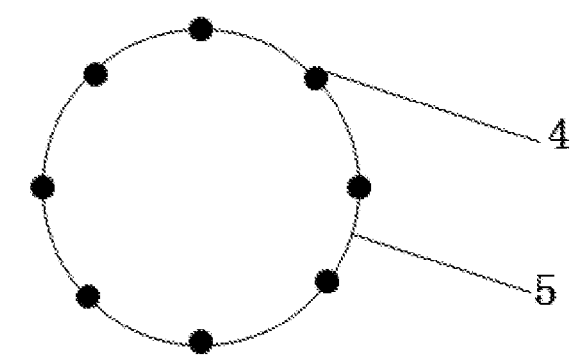
FIG. 3 is a vertical schematic diagram showing the high-voltage grid part of the existing trap lamp.

In FIG. 3, the wires of the high-voltage grid are parallel to each other, and vertical to the ground. The wires of the high-voltage grid in FIG. 3 are corresponding to the wires of the high-voltage grid in FIG. 2. The wires of the high-voltage grid are drawn into horizontal wires in FIG. 2, and unfolded in a plane for the requirement of the schematic circuit diagram of FIG. 2 only; the wires of the high-voltage grid are actually parallel to each other, and are vertical to the ground to form a circle.

FIG. 2 is equivalent to actually unfold the high-voltage grid and then anticlockwise rotate by 90 degrees.

The working principle of the present invention for approximately calculating the size of the injurious insects is described as follows: once there are insects falling on the wires of the high-voltage grid, the resistor between two adjacent wires will be short-circuited; because the constant-current source is connected in series with the resistor with same resistance values in the circuit, the value of the voltage outputted by the analogue-to-digital conversion module is linearly changed, and the quantity of the resistors that are short-circuited can be easily calculated out through the change of the voltage outputted by the analogue-to-digital conversion module; it is provided that two resistors are short-circuited at the same time, it can be judged that one insect short-circuits the two resistors at the same time, and it can be judged that the size of the insect is larger; because the distance between the adjacent wires is known, for example, 2 mm, it can be judged that the size of the insect is greater 4 mm; based on previous experiment experience, the probability for two insects to fall in the high-voltage grid (or wires) at the same moment is tiny, and can be neglected (the insects will be killed by electrocution at the moment that fall on the high-voltage grid, and then fall into the insect receiver 3 arranged below the trap lamp), while the frequencies of the high-frequency switches in the present invention are extremely high, which can implement the instantaneous action of the circuit; therefore, the injurious insects can be counted accurately, and the approximate sizes of the injurious insects can be calculated and judged.

The invention claimed is:

1. A real-time counting insecticidal lamp, comprising a rainproof cover, a LED lamp body, an insect receiver, and a high-voltage grid; the rainproof cover being arranged above the LED lamp body, the insect receiver being arranged below the LED lamp body, and the high-voltage grid being arranged at the periphery of the LED lamp body, wherein:

the high-voltage grid includes a high-voltage direct current power supply and N−1 wires, and the N−1 wires are arranged in parallel in each interval to form a circle, wherein, N is no less than 10;

the top ends of the wires are all connected to the power supply end of the high-voltage direct current power supply, but one of two adjacent wires is electrically connected to the positive end of the power supply while the other is electrically connected to the negative end of the power supply; and an injurious insect counting unit is further included, wherein:

the injurious insect counting unit comprises a direct current constant-current source, an analogue-to-digital conversion module, N resistors with same resistance values, (2N−2) high-frequency switches, a controller and a display module;

the two ends of the N resistors with same resistance values after being connected in series are connected to the two output ends of the direct current constant-current source;

the input end of the analogue-to-digital conversion module is connected to the two output ends of the constant-current source;

the output end of the analogue-to-digital conversion module is electrically connected to an IO input port of the controller;

the display module is electrically connected to the controller;

the N resistors with same resistance values have N−1 common nodes in total;

the bottom ends of the N−1 wires are electrically connected to one common node respectively through the high-frequency switches, but the bottom ends of adjacent wires are located at the two ends of the same resistor; and the high-frequency switches all comprise a control end, and the control ends of the high-frequency switches are all electrically connected to the controller.

2. The real-time counting insecticidal lamp according to claim 1, wherein the output current of the direct current constant-current source is 15 mA, N=30, and the resistance value of the resistor is 1 ohm.

3. The real-time counting insecticidal lamp according to claim 1, wherein the interval between adjacent wires is 2-20 mm.

4. The real-time counting insecticidal lamp according to claim 1, wherein the voltage of the high-voltage direct current power supply is 200-20000V.

5. The real-time counting insecticidal lamp according to claim 1, wherein the high-frequency switch is implemented using a controllable thyristor, and the switching frequency is over millisecond.

* * * * *